United States Patent [19]

Rachael, III

[11] Patent Number: 4,892,345
[45] Date of Patent: Jan. 9, 1990

[54] ARMORED VEHICLE

[76] Inventor: Stephen Rachael, III, 6329 Briergate, Bartlett, Tenn. 38134

[21] Appl. No.: 248,195

[22] Filed: Sep. 23, 1988

[51] Int. Cl.$^4$ .............................................. B60P 3/03
[52] U.S. Cl. ................................. 296/24.1; 296/37.6; 296/183
[58] Field of Search ...................... 296/24.1, 37.6, 183

[56] References Cited

U.S. PATENT DOCUMENTS

| | | | |
|---|---|---|---|
| 1,182,885 | 5/1916 | Bellamore | 296/24.1 |
| 1,611,248 | 12/1926 | Smith et al. | 296/24.1 |
| 1,632,360 | 6/1927 | Wilson | 296/24.1 |
| 2,092,448 | 9/1937 | Foote | 296/24.1 |
| 2,185,209 | 1/1940 | Love | 296/24.1 |
| 3,169,599 | 2/1965 | Johnston, Jr. | 296/24.1 X |
| 4,201,415 | 5/1980 | Suchanek | 296/190 |
| 4,227,735 | 10/1980 | Joyner | 296/24.1 |
| 4,506,870 | 3/1985 | Penn | 296/37.6 X |

FOREIGN PATENT DOCUMENTS

| | | | |
|---|---|---|---|
| 0766836 | 7/1934 | France | 296/24.1 |
| 8705068 | 8/1987 | World Int. Prop. O. | 296/24.1 |

Primary Examiner—Dennis H. Pedder
Attorney, Agent, or Firm—Richard C. Litman

[57] ABSTRACT

An armored vehicle includes a multi-compartmented cab section having an isolated driver area and adjacent crew member area each with a separate door providing access/exit therefrom. An attached vault section includes a plurality of separate cargo compartments provided with individual doors all of which are independently controlled for unlocking and opening, by the driver, through a remote system. A closed circuit of video cameras provides constant surveillance by the driver, over all the cargo doors and any person using same. An additional camera scans rearwardly of the vehicle such that between the cameras and crew members, 360 degree observation of valuables is provided. During transport, no co-mingling of cargo and personnel occurs, thereby offering the maximum protection, safety and security to both.

5 Claims, 1 Drawing Sheet

ARMORED VEHICLE

BACKGROUND OF THE INVENTION

This invention relates generally, to protective transport apparatus and more particularly, to an improved self-propelled armored vehicle providing enhanced protection, not only for various forms of securities but also, for the crew members operating the vehicle.

Armored vehicles for the transport of securities have for many years been constructed of a generally similar nature and the mechanics for handling of securities therewith have followed the same procedure. This has involved the provision of a truck body of suitable intrusion resistant material, having a forward crew cab and a rear securities compartment, each having separate access doors. Cargo, in the form of cartons and bags of currency, coin, food stamps and other securities, are trucked or carried by a crew member who loads and unloads same through a side or rear door of the cargo compartment. These securities are usually merely stacked upon the floor of the compartment in the most orderly fashion possible. At the start of a business day, a truck is loaded at the transport company vault, in a first in, last out manner, to facilitate the subsequent deliveries and preclude the need to shift or off-load and expose large containers of securities during the run, which would otherwise be required in order to access buried cargo scheduled for delivery at any one customer stop. Such off-loading and exposure is of course counter to desired security measures, not to mention the wasted time.

Policy of all security transport companies dictate that at no time will any of the cargo be out of the direct custody and control of at least one crew number. In view of the bulk stowage of valuables in the rear compartment of most armored vehicles, this means that at least one person will be riding within this compartment. This dictates that critical space must be reserved for appropriate seating of such persons, thereby reducing the available space for stowage of securities cargo. Additionally, such vehicles require the expense of heating, cooling and communications equipment for the cargo compartment.

The efficiency of a bulk cargo compartment leaves a lot to be desired. If the driver receives a call for an unscheduled pick-up, time and effort may be wasted as the crew is required to shift and relocate the new cargo so as to permit access to the scheduled deliveries already on board. This repetitive cargo shifting is all the more evident on cross-country runs wherein both deliveries and pick-ups are usually accomplished on the single run. The incidence of worker injuries in this environment is well recognized. The constant lifting of often heavy containers, frequently while one is stooped over within the cargo compartment, has led to numerous reports of disabling back injuries. Of even more concern, to working crew members, is the constant threat of injury from shifting cargo, such as during sudden starting, stopping and while the vehicle negotiates turns. The above comments point out the need for an improved armored vehicle such as advanced by the present invention and which will provide maximum safety to the crew members, allow ready access for loading and unloading of a large capacity of cargo and all while insuring the ultimate in security of the cargo, whether palletized, boxed or bagged.

DESCRIPTION OF THE RELATED ART

An example of a vehicle for the transport of valuables and wherein a rear vault area contains a plurality of safe deposit compartments will be found in U.S. Pat. No. 1,182,885 issued to Bellamore on May 16, 1916. The broad concept of trucks provided with externally accessible compartments is illustrated in Wilson U.S. Pat. No. 1,632,360 dated June 14, 1927 and Hummel U.S. Pat. No. 3,399,794 issued Sept. 3, 1968, the former of which is directed specifically to an armored vehicle. U.S. Pat. No. 2,185,209 dated Jan. 2, 1940 to Love shows an armored vehicle having separate driver, vault and delivery/collection areas, the latter of which comprises a trap chamber type of mechanism. The features of the present invention are not seen to be suggested by any combination of the known prior art.

SUMMARY OF THE INVENTION

By the present invention, an improved armored vehicle is provided for the secure transport of various types of valuables and wherein the body includes separate isolated sections provided for different members of the crew along with a remote surveillance system allowing monitoring of all portions of the body exterior including, a plurality of remotely controlled access doors associated with individual stowage compartments occupying the majority of the vehicle body.

Accordingly, one of the objects of the present invention is to provide an improved armored vehicle having separate, isolated compartments for the driver and other crew members and including a vault area, wherein the vault area includes a plurality of individual compartments having separate, individually controlled access doors.

Another object of the present invention is to provide an improved armored vehicle having an isolated driver compartment provided with an exterior door and adjacent a separate crew compartment having two exterior doors offering access thereto from either side of the vehicle.

Still another object of the present invention is to provide an improved armored vehicle having a vault area comprising a plurality of individual compartments each having a separate access door on the exterior of the vehicle body and all of which are remotely locked and/or unlocked by a secure crew member from within an isolated compartment of the vehicle.

A further object of the present invention is to provide an improved armored vehicle provided with exteriorly accessible vault compartments constantly scanned by surveillance cameras remotely monitored by protected crew members and/or security personnel stationed elsewhere.

Another object of the present invention is to provide an improved armored vehicle including a plurality of vault compartments having individual doors accessible from the exterior of the vehicle and which are automatically unlocked and opened according to a pre-programmed schedule.

With these and other objects in view which will more readily appear as the nature of the invention is better understood, the invention consists in the novel construction, combination and arrangement of parts hereinafter more fully described, illustrated and claimed.

BRIEF DESCRIPTION OF THE DRAWINGS

A preferred and practical embodiment of the invention is shown in the accompanying drawings, in which.

DESCRIPTION OF THE PREFERRED EMBODIMENT

Figure 1:
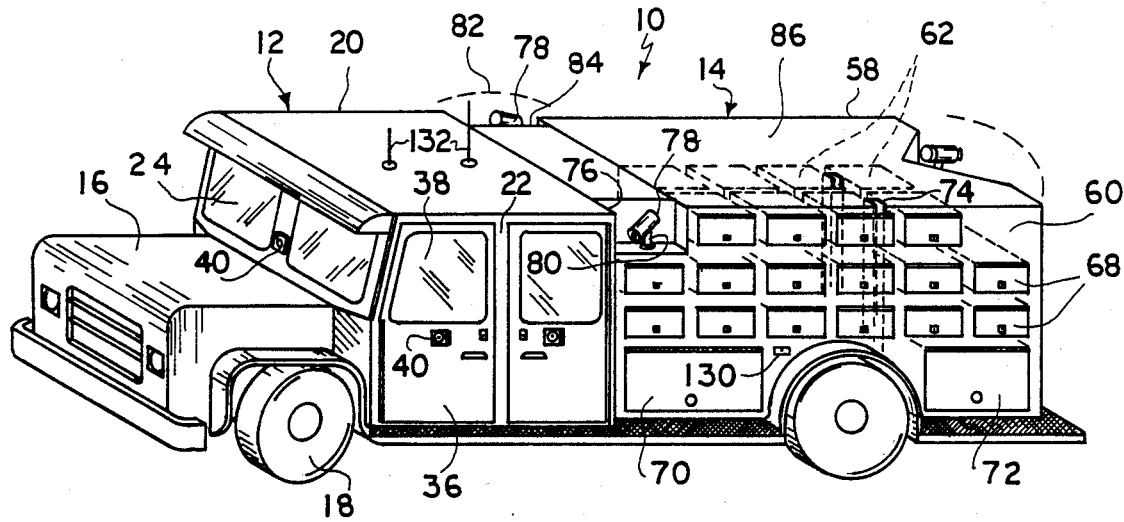
FIG. 1 is a perspective view of an armored vehicle according to the present invention.
Figure 2:
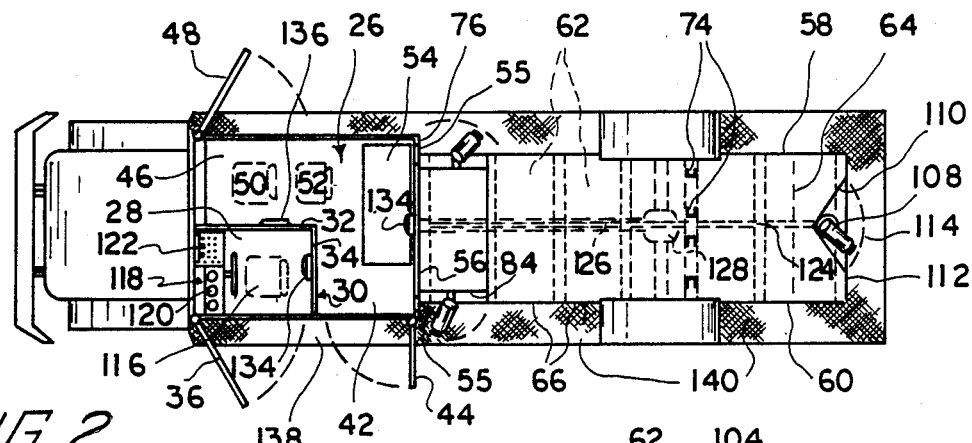
FIG. 2 is a plan view, partly in section, of the vehicle of FIG. 1.

Referring now to the drawings, particularly FIGS. 1 and 2, the present invention will be seen to comprise an armored vehicle, generally designated 10, and which preferably includes a unitized body construction having a forward crew section 12 joined to a rearward vault or cargo section 14. Although the drawings illustrate a front-most engine compartment 16 having the steerable wheels 18 thereunder, it will be appreciated that a cab-over engine configuration may be employed with the present invention.

The cab section 12 is bounded by opposite sides 20,22 preferably defining the maximum width of the vehicle body and includes a front windshield 24 of appropriate bullet resistant glass or other material. The interior of the cab section 12 is divided into a support crew compartment 26 and a driver compartment 28 by an intermediate barrier 30 including a side partition 32 and rear partition 34 such that the smaller driver compartment is isolated from the support crew. The barrier 30 is constructed of bullet resistant material and also provides an air-tight barrier between the two cab compartments 26,28. In this manner, a driver within the compartment 28 will be protected both from firearms well as gas, even if illegal entry is gained into the adjacent crew compartment 26.

The sole entry and exit for the driver compartment 28 is through the door 36 in the left side 22 of the cab section 12. This door and its window 38, like other body parts will be constructed of well known bullet resistant materials and includes one or more normally closed gun ports 40 for use by the driver.

The support crew compartment 26 of the cab section 12 will be seen to comprise an L-shaped interior and includes a transverse rear area 42, extending laterally the full width of the cab and which is bounded by a crew door 44 in the left side 22 of the cab. The transverse rear area 42 communicates with a longitudinal side area 46, adjacent to and extending the full length of the cab side 20. This latter area 46 is provided with access means in the form of a forward crew door 48. Fore and aft seats 50 and 52 longitudinally arranged within the side area 46, as well as a transversely disposed bench 54, adjacent the rear wall 56 of the cab, provide ample seating for a plurality of crew members within the compartment 26 and allow ready movement by personnel between the seating and either of the crew doors 44,48. With this construction, ease of movement by crew members is assured, either when making deliveries and pick-ups as will be described hereinafter or when responding to theft attempts.

A significant portion of the vehicles's length will be seen to be occupied by the rear vault or cargo section 14, the side walls 58,60 of which are preferably substantially planar and slightly inwardly offset with respect to the cab section sides 20,22 for reasons which will become apparent from the description following. Unlike the more conventional armored vehicles for the transport of valuables wherein the cargo is loaded into and delivered from the interior of a walk-in panel-body section, the instant invention utilizes a plurality of individual, vault or cargo compartments, generally designated 62, each of which defines a three-dimensioned area having a major, longitudinal axis 64 extending transversely of the vehicle. Each such compartment 62 is closed by imperforate material on all sides but for an outer opening 66 adapted to be completely sealed off by a displaceable door 68, 70 or 72. The various compartments 62 may share common walls or, as shown in FIG. 1, each include separate walls appropriately rigidly linked together, for example, by the intermediate channels 74.

The cargo section side walls 58,60 are disposed within planes inwardly offset with respect to the cab section sides 20,22 such that the rearwardly facing cab wall portions 76 are disposed in planes outwardly of the cargo section walls 58,60. Windows SS, SS at the outer ends of cab wall 76 allow direct visual access of the cargo walls S8,60 and the compartment doors 68,70 and 72 by a crew member. Mounted within the area between these two planes are a pair of video cameras 78, one located behind each cab rear wall portion 76. The cameras 78 are mounted, by means of a bracket 80, to the vehicle body so as to allow arcuate displacement thereof throughout a range of view as reflected by the arcs 82 in FIG. 1. To allow a more flush mounting of the cameras, a recess 84 is formed within the cargo section adjacent the intersection of the vehicle roof 86 and cab rear wall portions 76. In this manner, the cameras may be positioned just to the rear of the cab section, with suitable clearance therearound to permit scanning of the field of view 82. As shown most clearly in FIG. 2 of the drawing, the cameras are mounted such that a full view therefrom is attainable of all of the compartment doors 68, 70 and 72.

Access to any one of the cargo compartment doors is intended to be controlled by means of the driver or other crew member located within the cab section 12. With this provision, only the valuables destined for a particular customer will be made accessible at any one time, thereby reducing the vulnerability of the balance of the vehicle's cargo to any illegal deed, be it pilferage on the part of dishonest employees or a theft attempt.

Figure 3:
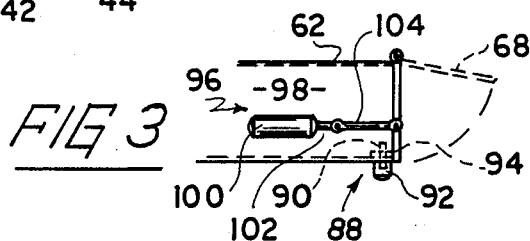
FIG. 3 is an enlarged, fragmentary side elevation of an actuating and locking mechanism as provided for each of the vault access doors.
Figure 4:
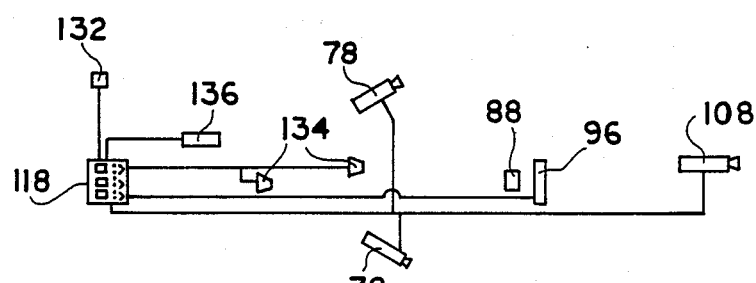
FIG. 4 is a diagram of a typical monitoring and control system, Similar reference characters designate corresponding parts throughout the several views of the drawings.

Any of various types of latching and displacement mechanisms may be employed to regulate movement of the cargo compartment doors. FIG. 3 illustrates a construction that may be used and which includes remotely releasable locking means 88 for maintaining each door 68, 70, and 72 in a closed, secured position. This locking mechanism includes a lock bolt 90 which is actuated by means of a solenoid 92. With the solenoid fixed with respect to the cargo section side wall 58 or 60, it will be understood that actuation thereof sequentially shifts the bolt 90 into or out of a catch 94 on the inner surface of each door. When a catch 94 is released from any door, displacement means 96 is activated to move the attached door between the vertical, closed position, to an elevated, open position, thus exposing the interior 98 of the associated cargo compartment. A suggested displacement means includes a double acting solenoid 100, the reciprocating shaft 102 of which serves to shift an actuating arm 104 attached to the door. To insure a smooth interior for the compartments, the solenoid 100 is preferably mounted outside each compartment and may communicate with the arm 104, such as through a slot in the compartment side wall.

Although the two side mounted cameras 78,78 provide adequate surveillance over any activity in the areas adjacent the cargo compartment doors 68, 70 and 72, and the crew members within the forward cab 12 already have a sweeping view of a substantial area laterally and forward of the vehicle, a blind area exists directly to the rear of the vehicle. Accordingly, surveillance is provided for this area by means of a video camera 108 mounted within a recess 110 formed in the vehicle back wall 112. This camera is likewise mounted for remotely controlled displacement by the crew members, throughout the arc 114.

A driver, occupying the seat 116 within the compartment 28 serves as the master controller of the operation of the vehicle 10 and is provided with a control console 118 containing a trio of monitors 120 respectively displaying the view captured by each of the three cameras 78, 78 and 108. A keyboard 122 includes switches enabling the driver to remotely displace each camera to determine its field of view. Additional switches are assigned to each of the plurality of vault compartment doors, to regulate the operation of the bolt and door actuating solenoids 92, 100.

During operation of the present apparatus, when a pick-up or delivery is to be made, one or more crew members disembark from the support crew compartment 26 through either or both of the doors 44,48 and when ready to withdraw from or load into, the pre-assigned vault compartment(s) for the particular customer at hand, the driver, from within his compartment 28, operates the control console 118 to unlock and open the assigned vault compartment door(s). The support crew member(s) may either manually close the doors thereafter or preferably, the solenoids 92,100 are actuated by the driver to insure that all doors are closed and locked from manipulation of his keyboard 122. All the while, the passage of the crew member(s) to and from the adjacent customer's establishment, and throughout the transfer of the involved valuables to or from the vault compartments, is monitored by the driver, through the cameras.

The majority of the compartments 62 will be understood to extend to the vehicle centerline 124 while those wider and higher compartments associated with the lowermost doors 70,72 are not as deep as the uppermost compartments 62, in view of the existence of the vehicle's drive shaft 126 and rear axle assembly 128.

As a further or cumulative control measure, an auxiliary control means 130 may be mounted on both side walls 58,60 whereby a crew member would be required to enter a discrete keyboard code or use a specific key, before the driver could unlock and operate any of the vault compartment doors.

Any well known computer technology may be employed to regulate the operation of the vault compartment doors and such programming may alternatively be controlled remote from the vehicle, such as by radio signal from the vehicle operator's headquarters office. Voice, as well as data transmission is supplied by appropriate antennae 132 mounted on the vehicle body. Any antenna may also comprise the surface skin type or be embedded within the windshield, as is well known.

To insure constant communication between all members of the crew, speaker-microphones 134 are mounted within both the crew and driver compartments and, an auxiliary monitor assembly 136 is located within the crew compartment 26 so the support crew members will have visual access to the surveillance as provided by all the cameras.

To facilitate movement of personnel while entering or exiting the crew cab section 12, a running board 138 is provided along each side and this member will be seen to extend rearwardly to present an even wider running board 140 at the bottom of the cargo section 14. This latter construction particularly assists crew members when loading or unloading bulky or heavy loads from the upper rows of vault compartments.

From the foregoing it will be seen that an improved armored vehicle is provided wherein, enhanced protection is presented for the driver and other support crew members and individual vault compartments are provided with separate, remotely controlled doors such that accountability, protection and safety of both personnel and the transported valuables is vastly improved.

What is claimed is:

1. An armored vehicle comprising;
   a body including a forward cab section and an rearward vault section,
   said vault section provided with left and right side walls having a plurality of cargo compartments therebetween each having a separate door juxtaposed a respective one said side wall,
   actuating means for unlocking and permitting opening of said compartment doors whereby access may be had to said cargo compartments,
   said cab section includes opposite sides each provided with at least one door permitting passage of crew members,
   said vault section side walls disposed in planes inwardly offset from the plane of said cab section sides,
   control means operable from within said cab section to activate said actuating means,
   video cameras on said body having a field of view encompassing said compartment doors,
   at least two said video cameras respectively disposed on said vault section adjacent the juncture between said cab and vault sections and disposed in defined spaces recessed from said vault section side walls, and
   video monitor means within said cab section displaying the images captured by said video cameras.

2. An armored vehicle according to claim 1 including,
   a rear wall on said vault section, and
   at least one said video camera mounted adjacent said rear wall.

3. An armored vehicle according to claim 1 wherein,
   said cab section includes an interior partition forming isolated driver and crew compartments therein, and
   said control means disposed within said driver compartment.

4. An armored vehicle according to claim 1 wherein,
   said cab section includes an interior partition forming a driver's compartment isolated from a crew member compartment, and a separate door in said cab section leading to each said cab section compartment.

5. An armored vehicle according to claim 1 including,
a rear wall on said cab section laterally extending beyond the plane of said vault section side walls, and
windows in said rear wall allowing a crew member within said cab section to visually observe said cargo compartment doors.

* * * * *